United States Patent
Chen et al.

(10) Patent No.: US 9,013,445 B2
(45) Date of Patent: Apr. 21, 2015

(54) CAPACITIVE TOUCH DEVICE AND SENSING METHOD THEREOF

(75) Inventors: Chun-Hung Chen, Taipei (TW); Yi-Rong Ko, Hsinchu (TW); Chih-Peng Hsia, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 507 days.

(21) Appl. No.: 13/532,188

(22) Filed: Jun. 25, 2012

(65) Prior Publication Data
US 2013/0257790 A1    Oct. 3, 2013

(30) Foreign Application Priority Data
Mar. 28, 2012 (TW) .............. 101110874 A

(51) Int. Cl.
*G06F 3/045* (2006.01)
*G06F 3/041* (2006.01)
*G06F 3/044* (2006.01)
*G06F 3/0488* (2013.01)

(52) U.S. Cl.
CPC .............. *G06F 3/044* (2013.01); *G06F 3/0488* (2013.01)

(58) Field of Classification Search
CPC ....... G06F 3/044; G06F 3/047; G06F 3/0488; G06F 3/0412; G06F 3/0416
USPC .................................................. 345/173, 174
See application file for complete search history.

(56) References Cited

FOREIGN PATENT DOCUMENTS

TW          M363639 U       8/2009

OTHER PUBLICATIONS

Taiwanese Office Action dated on Jun. 24, 2014.

*Primary Examiner* — Aneeta Yodichkas
(74) *Attorney, Agent, or Firm* — Rabin & Berdo, P.C.

(57) ABSTRACT

A capacitive touch device includes a capacitive touch panel, a driving control unit, k ADCs, a multiplex network and a processing unit. The capacitive touch panel has an m×n sensing point matrix formed by m driving line and n sensing lines. The driving control unit is coupled to the m driving lines. The multiplex network connects the n sensing lines and the k ADCs by time-domain multiplexing. The processing unit is coupled to the k ADCs. At least a part of the driving lines and at least a part of the sensing lines are assigned to be electrically connected. The processing unit senses according to multiple frequencies to obtain multiple signal strength values, and selects the frequency corresponding to a smallest signal value to be a sensing frequency of the capacitive touch device.

20 Claims, 6 Drawing Sheets

CAPACITIVE TOUCH DEVICE AND SENSING METHOD THEREOF

This application claims the benefit of Taiwan application Serial No. 101110874, filed Mar. 28, 2012, the subject matter of which is incorporated herein by reference.

BACKGROUND OF THE INVENTION

1. Field of the Invention

The invention relates a capacitive touch device and sensing method thereof.

2. Description of the Related Art

In a current capacitive touch device, after sensing a capacitive touch panel, it is determined whether the touch panel is touched according to a sensing result to accordingly determine a touch position or a control gesture. To increase operating sensitivity, a sensing result is thoroughly inspected for distinguishing minute differences. However, it is possible that an actual operation environment of a capacitive touch device is filled with noises such that a satisfactory signal-to-noise ratio (SNR) can only be obtained to maintain the operation sensitivity by reinforcing signal strength or reducing noises.

For example, the signal strength is reinforced by boosting a driving voltage. Common noises form new electric fields with the capacitive touch device to produce undesirable effects. Source of electric fields include human static electricity, an LCD module, a power supply, a charger or household appliances. For example, approaches for reducing noises for maintaining a preferred SNR include synchronization, shielding, filter and grounding.

However, all of the above approaches for reinforcing signal strength or reducing noises need extra costs, and may also lead to a change in an overall structure and thus fail to meet a light and compact design.

SUMMARY OF THE INVENTION

The invention is directed to a capacitive touch device and associate sensing method for providing an optimal sensing frequency for resisting against noises in an actual operation environment.

According to an aspect of the present invention, a capacitive touch device is provided. The capacitive touch device includes a capacitive touch panel, a driving control unit, k analog-to-digital converters (ADCs), a multiplex network and a processing unit, where k is a positive integer. The capacitive touch panel has an m×n sensing point matrix formed by m driving lines and n sensing lines, where m and n are a positive integer, respectively. The driving control unit is coupled to the m driving lines. The multiplex network connects the n sensing lines and the k ADCs by time-domain multiplexing. The processing unit is coupled to the k ADCs. At least a part of the m driving lines and at least a part of the n sensing lines are assigned to be electrically connected. According to multiple frequencies within a predetermined range, the processing unit senses the electrically connected driving lines and sensing lines to obtain multiple signal strength values from the corresponding ADCs. The processing unit then selects the frequency corresponding to a smallest frequency to be a sensing frequency of the capacitive touch device.

According to another aspect of the present invention, a sensing method for a capacitive touch device is provided. The capacitive touch device includes a capacitive touch panel, a driving control unit, k ADCs, a multiplex network and a processing unit, where k is a positive integer. The capacitive touch panel has an m×n sensing point matrix formed by m driving lines and n sensing lines. The driving control unit is coupled to the m driving lines. The multiplex network connects the n sensing lines and the k ADCs by time-domain multiplexing. Wherein, m, n and k are a positive integer, respectively. The sensing method includes steps of: assigning at least a part of the driving lines and at least a part of the sensing lines to be electrically connected; sensing the electrically connected driving lines and sensing lines by the processing unit according to multiple frequencies within a predetermined range to obtain multiple signal strength values from the corresponding ADCs; comparing the signal strength values by the processing unit; and selecting the frequency corresponding to a smallest signal strength by the processing unit to be a sensing frequency of the capacitive touch device.

According to yet another aspect of the present invention, a capacitive touch device is provided. The touch device includes a capacitive touch panel, a driving control unit, k ADCs, a multiplex network, at least one dummy scan line and a processing unit, where k is a positive integer. The capacitive touch panel has an m×n sensing point matrix formed by m driving lines and n sensing lines, where m and n are a positive integer, respectively. The driving control unit is coupled to the m driving lines. The multiplex network connects the n sensing lines and k ADCs by time-domain multiplexing. The at least one dummy scan line is disposed on the capacitive touch panel and connects to one of the k ADCs. The processing unit is coupled to the k ADCs. According to multiple frequencies within a predetermined range, the processing unit senses the at least one electrically connected dummy scan line to obtain multiple signal strength values from the corresponding ADC. The processing unit then selects the frequency corresponding to a smallest frequency to be a sensing frequency of the capacitive touch device.

The above and other aspects of the invention will become better understood with regard to the following detailed description of the preferred but non-limiting embodiments. The following description is made with reference to the accompanying drawings.

DETAILED DESCRIPTION OF THE INVENTION

In a capacitive touch device and associate method provided by the disclosure, through connections between driving lines and sensing lines or a dummy scan line, an optimal sensing frequency is obtained according to sensed noise strengths to resist against noises in an actual operation environment.

Figure 1:
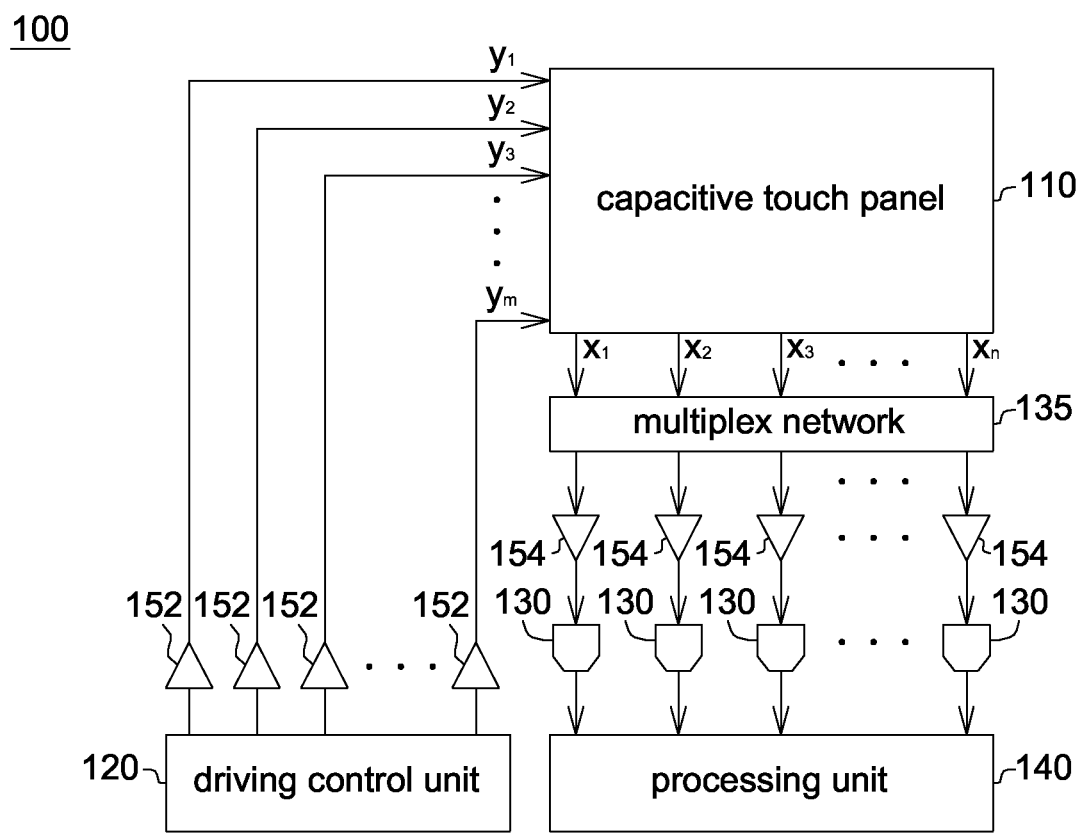
FIG. 1 is a block diagram of a capacitive touch device according to one embodiment.

FIG. 1 shows a block diagram of a capacitive touch device according to one embodiment. A capacitive touch device 100 includes a capacitive touch panel 110, a driving control unit 120, k analog-to-digital converters (ADCs) 130, a multiplex network 135 and a processing unit 140. The capacitive touch panel 110 has an m×n touch point matrix formed by m driving lines $y_1$ to $y_m$ and n sensing lines $x_1$ to $x_n$, where m and n are a positive integer, respectively. The driving control unit 120 is coupled to the m driving lines $y_1$ to $y_m$. The capacitive touch device 100 may further include m amplifiers 152, and the driving control unit 120 may substantially be coupled to the m driving lines $y_1$ to $y_m$ through an approach of a programmable array logic, respectively.

The multiplex network 135 connects to the n sensing lines $x_1$ to $x_n$ and the k ADCs 130 by time-domain multiplexing. The ADCs 130 convert received values to signal strength values, each of which indicates a sensed capacitance value at a sensing point where each driving line and each sensing line intersect. The capacitive touch device 100 may further include k amplifiers 154, and the k ADCs 130 may substantially be coupled to the n sensing lines $x_1$ to $x_n$ through the k amplifiers 154 by an approach of a programmable array logic, respectively. When the sensed signal strength values are too weak, integration may be performed by the amplifiers 154 to provide the integration results to the ADCs 130 for further conversion.

The processing unit 140, coupled to the k ADCs 130, detects the m×n sensing point matrix by mutual sensing and performs subsequent determination and processing on the signal strength values provided by the ADCs 130. For example, the driving control unit 120 and the processing unit 140 can substantially be integrated into a capacitance sensing integrated circuit.

Figure 2:
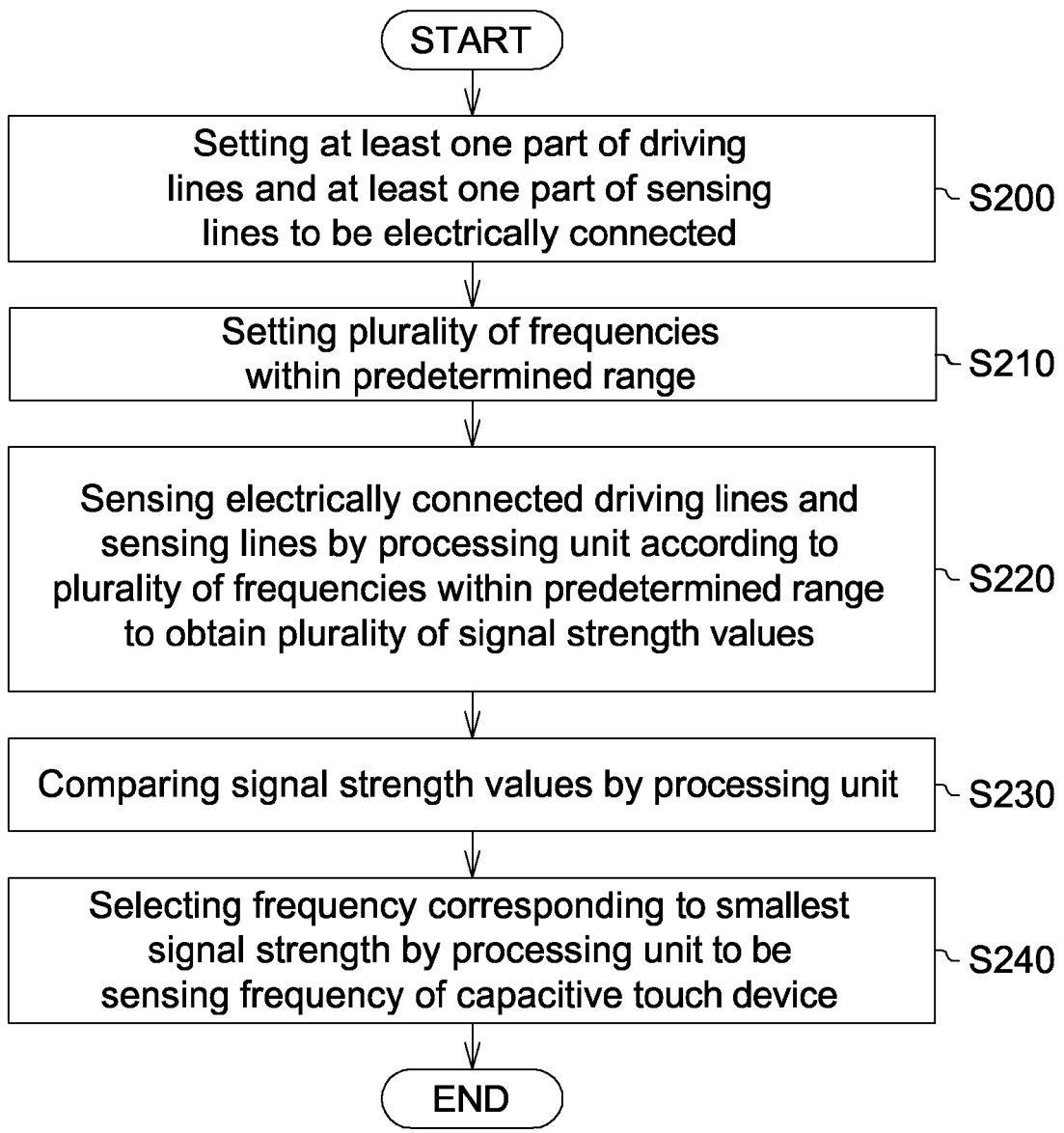
FIG. 2 is a flowchart of a sensing method for a capacitive touch device according to one embodiment.
Figure 3:
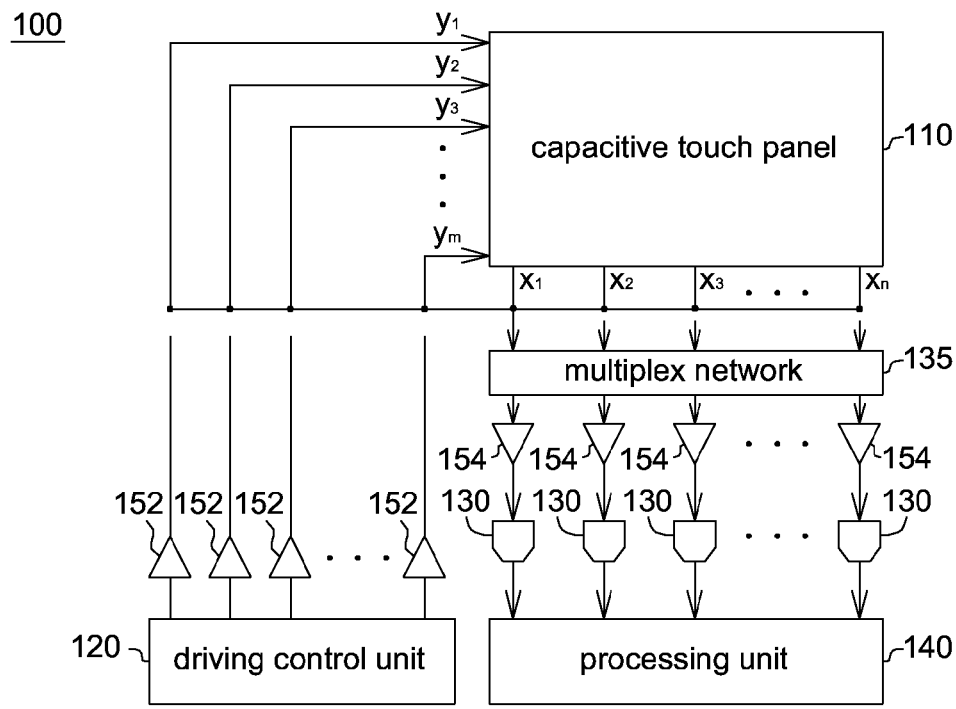
FIG. 3 is a schematic diagram of a capacitive touch device according to one embodiment.

FIG. 2 shows a flowchart of a sensing method for a capacitive touch device according to one embodiment. In Step S200, at least a part of the driving lines $y_1$ to $y_m$ and at least a part of the sensing lines $x_1$ to $x_n$ are assigned to be electrically connected. Methods for electrically connecting the driving lines $y_1$ to $y_m$ and the sensing lines $x_1$ to $x_n$ are not limited, and can be designed according to actual requirements. Referring to FIG. 3, all the driving lines $y_1$ to $y_m$ and all the sensing lines $x_1$ to $x_n$ are assigned to be electrically connected. Thus, all the sensing points are regarded as a same sensing point, and the capacitive touch device 100 may be regarded as a noise detector.

Figure 4:
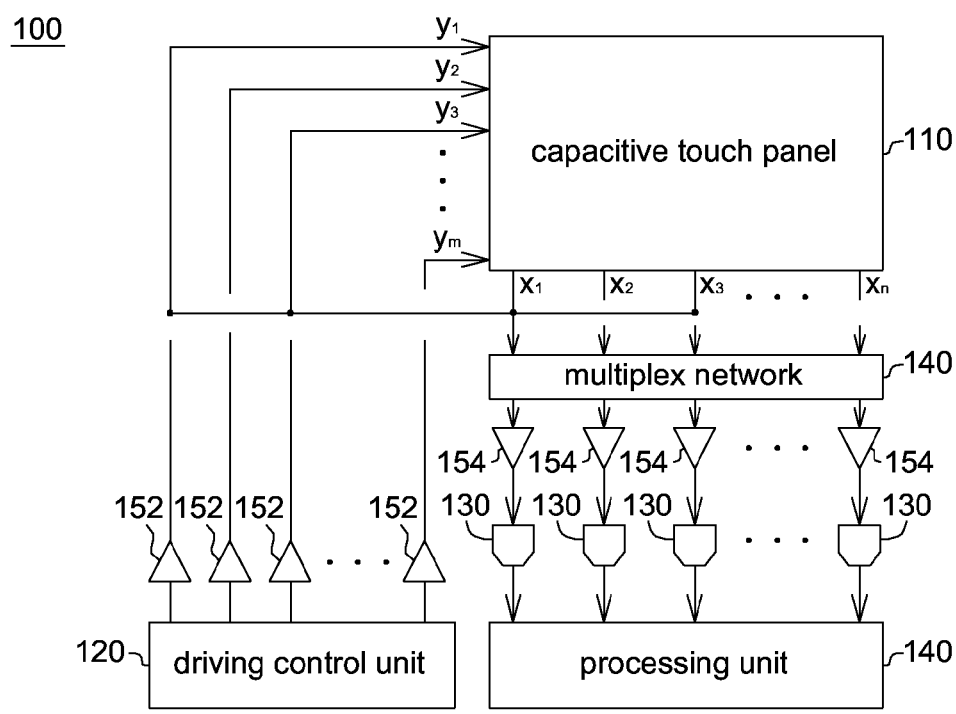
FIG. 4 is a schematic diagram of a capacitive touch device according to another embodiment.

FIG. 4 shows a schematic diagram of a capacitive touch device according to an alternative embodiment. In FIG. 4, the driving lines $y_1, y_3, \ldots$ and the sensing lines $x_1, x_3, \ldots$ are assigned to be electrically connected. Further, considering that a sensing time for sensing the m×n sensing point matrix may be too long, the driving lines $y_1$ to $y_m$ and the sensing lines $x_1$ to $x_n$ may be grouped to reduce a scan time and to appropriately observe higher frequency noises. For example, the driving lines $y_1$ to $y_m$ are grouped into first driving lines $y_1, y_3, \ldots$, and second driving lines $y_2, y_4, \ldots$; the sensing lines $x_1$ to $x_m$ are grouped into first sensing lines $x_1, x_3, \ldots$, and second sensing lines $x_2, x_4, \ldots$. The first driving lines $y_1, y_3, \ldots$ and the first sensing lines $x_1, x_3, \ldots$ are assigned to be electrically connected, and the second driving lines $y_2, y_4, \ldots$ and the second sensing lines $x_2, x_4, \ldots$ are assigned to electrically connected. Methods for electrically connecting the driving lines $y_1$ to $y_m$ and the sensing lines $x_1$ to $x_m$ are not limited, and are preferably capable of covering the entire capacitive touch device 110.

In Step S210, a plurality of frequencies within a predetermined range are set. For example, the predetermined range is an entire frequency range, or is a specific frequency range by taking limited time and particular environments into consideration. In Step S220, the processing unit 140 senses the electrically connected driving lines and sensing lines according to the plurality of frequencies within the predetermined range, and obtains from the corresponding ADCs 130 a plurality of signal strength values corresponding to the different frequencies. In Step S230, the processing unit 140 compares the signal strength values. In Step S240, the processing unit 140 selects the frequency corresponding to a smallest signal strength value to be a sensing frequency of the capacitive touch device 100.

For example, the processing unit 140 performs the comparison through a statistical approach. For example, the processing unit 140 obtains a difference by subtracting a smallest signal strength value from a largest signal strength value under a same frequency, compares the differences of different frequencies, and determines the frequency corresponding to smallest difference to be the optimal sensing frequency. For example, the processing unit 140 utilizes a difference between two successive signal strength values under a same frequency. When the difference is greater than a predetermined value, a count value is added by 1. The count values of different frequencies are compared, and the frequency corresponding to the smallest count value is selected as the optimal sensing frequency. For example, the processing unit 140 first obtains an average value of all the signal strength values, accumulates an absolute value of subtracting the average value by each of the signal strength values, and expresses the strength of the noise by an energy integration value. The energy integration values corresponding to difference frequencies are compared, and the frequency corresponding to a smallest energy integration value is selected to be the optimal sensing frequency.

For example, the processing unit 140 obtains a root-mean-square of all the signal strength values under a same frequency, accumulates an absolute value of subtracting the average value by each of the signal strength values, and expresses the strength of the noise by an energy integration value. The energy integration values corresponding to difference frequencies are compared, and the frequency corresponding to a smallest energy integration value is selected to be the optimal sensing frequency. For example, the processing unit 140 first obtains an intermediate value of all the signal strength values sequentially arranged under a same frequency, accumulates an absolute value of subtracting the average value by each of the signal strength values, and expresses the strength of the noise by an energy integration value. The energy integration values corresponding to difference frequencies are compared, and the frequency corresponding to a smallest energy integration value is selected to be the optimal sensing frequency. For example, the processing unit 140 performs a statistical calculation on all the signal strength values under a same frequency, accumulates an absolute value of subtracting the average value by each of the signal strength values, and expresses the strength of the noise by an energy integration value. The energy integration values corresponding to difference frequencies are compared, and the frequency corresponding to a smallest energy integration value is selected to be the optimal sensing frequency.

For example, the processing unit 140 further selects a plurality of frequencies corresponding to relatively smaller signal strength values to be sensing frequencies of the capacitive touch device 100. That is, the capacitive touch device 100 selects an optimal sensing frequency or a plurality of preferred sensing frequencies for sensing the m×n sensing point matrix for resisting against noises of an actual operation environment.

When a plurality of driving lines and a plurality of sensing lines are electrically connected, an overload may cause the ADCs 130 to fail in obtaining the signal strength values. Therefore, in Step S220, the driving control unit 120 further outputs a driving voltage through one of the driving lines that is not electrically connected to the m×n sensing point matrix. The processing unit 140 then senses the electrically connected driving lines and sensing lines according to a plurality of sensing frequencies. Thus, the driving voltage may be regarded as a carrier wave such that the noises moving the carrier wave can be detected to obtain the signal strength values.

Figure 5:
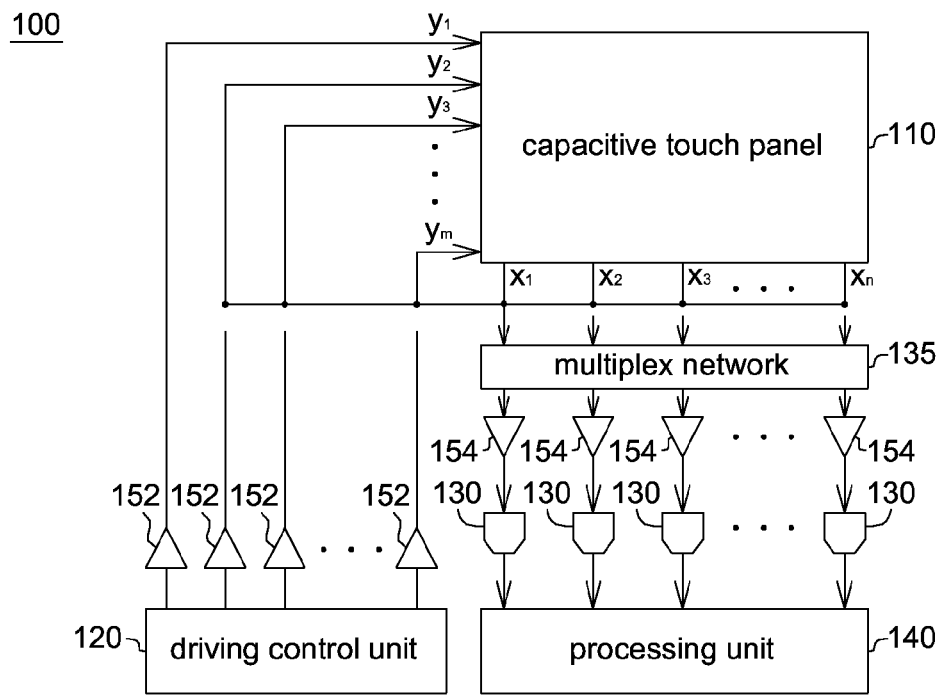
FIG. 5 is a schematic diagram of a capacitive touch device according to another embodiment.
Figure 6:
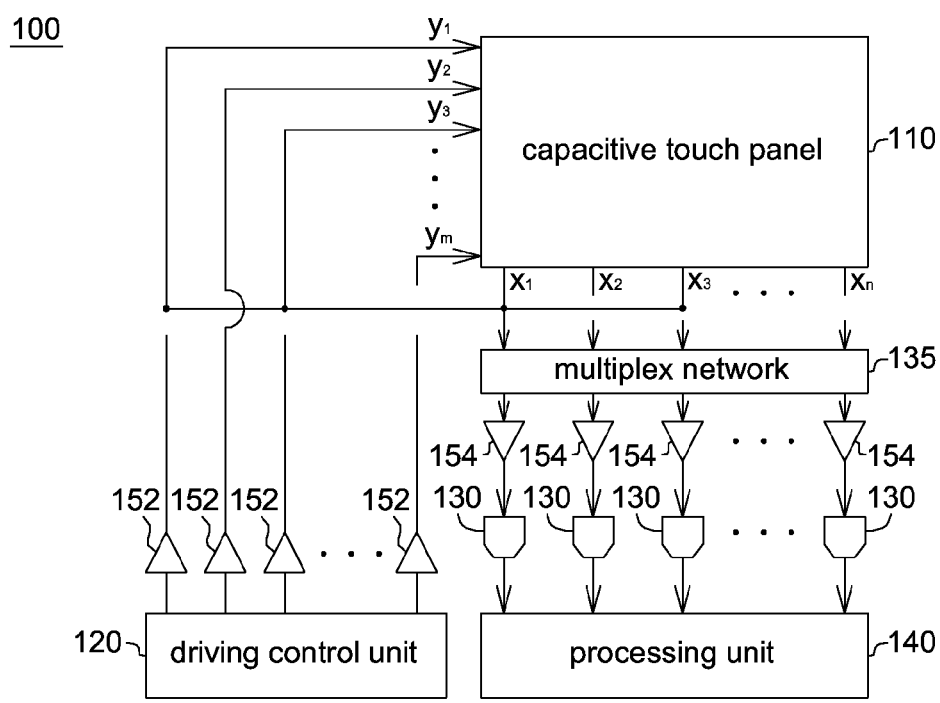
FIG. 6 is a schematic diagram of a capacitive touch device according to yet another embodiment.

FIG. 5 shows a schematic diagram of a capacitive touch device according to yet another embodiment. In FIG. 5, all the driving lines $y_2$ to $y_m$ and all the sensing lines $x_1$ to $x_m$ are assigned to be electrically connected, and the driving control unit 120 outputs a driving voltage through the driving line $y_1$ to the m×n sensing point matrix. FIG. 6 shows a schematic diagram of a capacitive touch device according to yet another embodiment. In FIG. 6, the driving lines $y_1$, $y_3$, . . . and the sensing lines $x_1$, $x_3$, . . . are assigned to be electrically connected, and the driving unit 120 outputs a driving voltage through the driving line $y_2$ to the m×n sensing point matrix.

Figure 7:
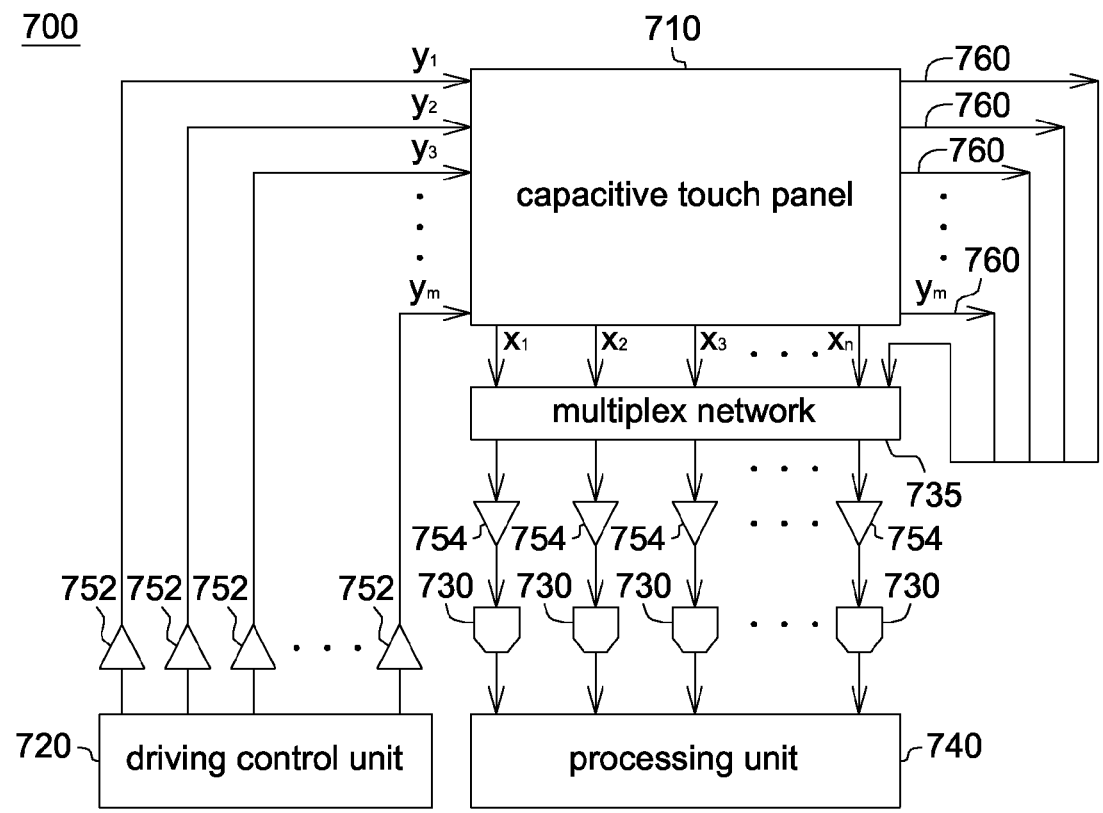
FIG. 7 is a block diagram of a capacitive touch device according to another embodiment.

Apart from the approaches of electrically connecting at least a part of the driving lines and at least a part of the sensing lines as in the above description, at least one dummy scan line may also be utilized for sensing the noise strength according to another embodiment of the disclosure. FIG. 7 shows a schematic diagram of a capacitive touch device according to another embodiment. A capacitive touch device 700 includes a capacitive touch panel 710, a driving control unit 720, k ADCs 730, a multiplex network 735, at least one dummy scan line 760 and a processing unit 740. The capacitive touch panel 710 has an m×n sensing point matrix formed by m driving lines $y_1$ to $y_m$ and n sensing lines $x_1$ to $x_n$, where m and n are a positive integer, respectively. The driving control unit 720 is coupled to the m driving lines $y_1$ to $y_m$. The capacitive touch device 700 may further include m amplifiers 752, and the driving control unit 720 may substantially be coupled to the m driving lines $y_1$ to $y_m$ through an approach of a programmable array logic, respectively.

The multiplex network 735 connects to the n sensing lines $x_1$ to $x_n$ and the k ADCs 730 by time-domain multiplexing. The capacitive touch device 700 may further include k amplifiers 754, and the k ADCs 730 may substantially be coupled to the n sensing lines $x_1$ to $x_n$ through the k amplifiers 754 by an approach of a programmable array logic, respectively. The at least one dummy scan line 760 is disposed on the capacitive touch panel 710 and connects to one of the k ADCs 754. The processing unit 740 is coupled to the k ADCs 730.

Figure 8:
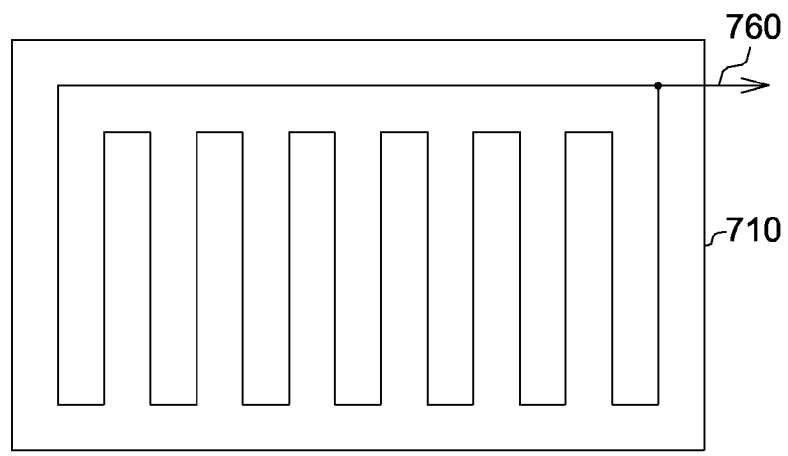
FIGS. 8 to 10 are schematic diagrams illustrating an arrangement relationship between at least one dummy scan line and a capacitive touch panel according to one embodiment.
Figure 9:
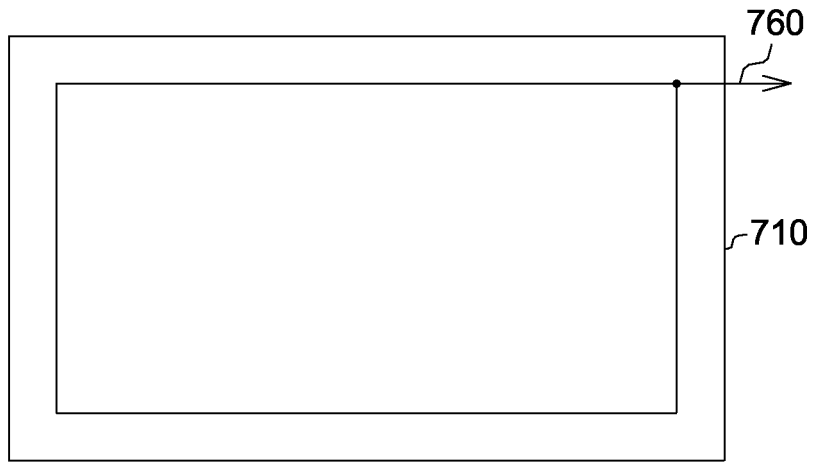
Figure 10:
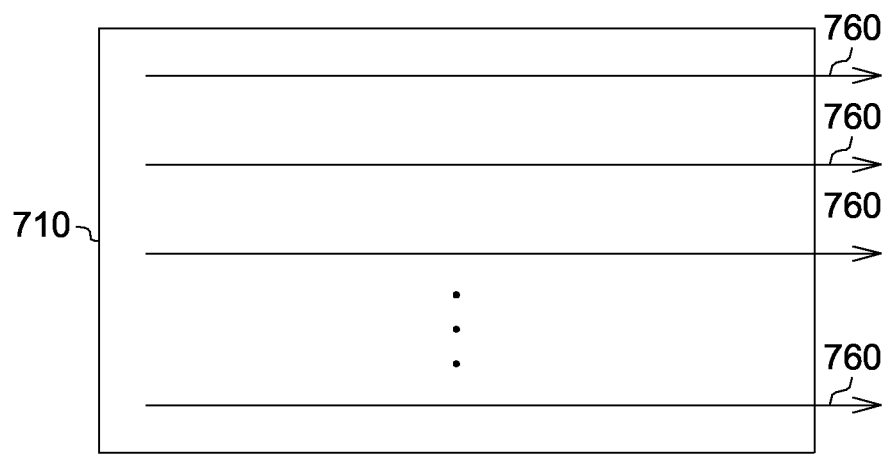

FIGS. 8 to 10 shows schematic diagrams illustrating an arrangement relationship between at least one dummy scan line and a capacitive touch panel according to one embodiment. In FIG. 8, the at least one dummy scan line 760 is disposed on the capacitive touch panel 710 in a fencing layout arrangement. In FIG. 9, the at least one dummy scan line 760 is disposed on the capacitive touch panel 710 in a quadrilateral layout arrangement. In FIG. 10, the at least one dummy scan line 760 is disposed on the capacitive touch panel 710 in a traversing strip-like layout arrangement.

The processing unit 740 senses the at least one electrically connected dummy scan line 760 according to a plurality of frequencies within a predetermined range and obtains a plurality of signal strength values from the corresponding ADC, and selects the frequency corresponding to a smallest signal strength value to be a sensing frequency of the touch device 700.

Further, in addition to the at least one dummy scan line 760 implemented by the capacitive touch device 700, the at least a part of the driving lines $y_1$ to $y_m$ and the at least a part of the sensing lines $x_1$ to $x_n$ in the foregoing capacitive touch device 100 can also be jointly implemented. That is, for example, the at least one dummy scan line 760 is jointly implemented with the at least a part of the driving lines $y_1$ to $y_m$ and the at least a part of the sensing lines $x_1$ to $x_n$ that are assigned to be electrically connected in FIGS. 3 to 6.

Therefore, with the above embodiments, the capacitive touch device and sensing method thereof is as described by the disclosure. Through connections between the driving lines and the sensing lines or the dummy scan line, an optimal sensing frequency is obtained according to the sensed noise strengths to resist against noises in an actual operation environment. Thus, an optimal sensing frequency is obtained according to the environment or an overall status before implementing capacitive touch device, and the sensing frequency can also be dynamically updated when implementing the capacitive touch device to adapt to the environment at all times. Further, the disclosure further utilizes a grouping approach to significantly reduce the number sensing points to be sensed, so that the time needed for searching the optimal sensing frequency is shortened to be even more suitable for quickly observing environmental noises and performing dynamic updates. Without any additional design and costs, the capacitive touch device and sensing method thereof is capable of reducing noises.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A capacitive touch device, comprising:
    a capacitive touch panel, having an m×n sensing point matrix formed by m driving lines and n sensing lines, m and n being a positive integer, respectively;
    a driving control unit, coupled to the m driving lines;
    k analog-to-digital converters (ADCs), k being a positive integer;
    a multiplex network, connecting the n sensing lines and the k ADCs by time-domain multiplexing; and
    a processing unit, coupled to the k ADCs;
    wherein, at least a part of the driving lines and at least a part of the sensing lines are assigned to be electrically connected; the processing unit senses the electrically connected driving lines and sensing lines according to a plurality of frequencies within a predetermined range to obtain a plurality of signal strength values from the corresponding ADCs, and selects the frequency corresponding to a smallest signal strength value to be a sensing frequency of the capacitive touch device.

2. The capacitive touch device according to claim 1, wherein the processing unit further selects the frequencies corresponding to smaller signal strength values to be sensing frequencies of the capacitive touch device.

3. The capacitive touch device according to claim 1, further comprising:
a plurality of amplifiers;
wherein, the driving control unit is coupled to the m driving lines through the m amplifiers, respectively, and the k ADCs are coupled to the n sensing lines through the k ADCs by time-domain multiplexing, respectively.

4. The capacitive touch device according to claim 1, wherein all the driving lines and all the sensing lines are assigned to be electrically connected.

5. The capacitive touch device according to claim 1, wherein the driving lines are grouped into first driving lines and second driving lines, the sensing lines are grouped into first sensing lines and second sensing lines, the first driving lines and the first sensing lines are assigned to be electrically connected, and the second driving lines and the second sensing lines are assigned to be electrically connected.

6. The capacitive touch device according to claim 1, wherein one of the driving lines unassigned to be electrically connected outputs a driving voltage to the m×n sensing point matrix, and the processing unit senses the electrically connected driving lines and sensing lines according to the frequencies.

7. The capacitive touch device according to claim 1, wherein the processing unit compares and selects the sensing frequency through a statistical approach.

8. A sensing method for a capacitive touch device, the capacitive touch device comprising a capacitive touch panel, a driving control unit, k ADCs, a multiplex network and a processing unit, the capacitive touch panel having an m×n matrix formed by m driving lines and n sensing lines, the driving control unit being coupled to the m driving lines, the multiplex network connecting the n sensing lines and the k ADCs by time-domain multiplexing, the processing unit being coupled to the k ADCs, k, m and n being a positive integer, respectively; the sensing method comprising:
assigning at least a part of the driving lines and at least a part of the sensing lines to be electrically connected;
sensing the electrically connected driving lines and sensing lines by the processing unit according to a plurality of frequencies within a predetermined range to obtain a plurality of signal strength values from the corresponding ADCs;
comparing the signal strength values by the processing unit; and
selecting the frequency corresponding to a smallest signal strength by the processing unit to be a sensing frequency of the capacitive touch device.

9. The sensing method according to claim 8, further comprising:
selecting the frequencies corresponding to smaller signal strength values by the processing unit to be sensing frequencies of the capacitive touch device.

10. The sensing method according to claim 8, further comprising:
assigning all the driving lines and all the sensing lines to be electrically connected.

11. The sensing method according to claim 8, further comprising:
grouping the driving lines into first driving lines and second driving lines, and grouping the sensing lines into first sensing lines and second sensing lines; and
assigning the first driving lines and the first sensing lines to be electrically connected, and assigning the second driving lines and the second sensing lines to be electrically connected.

12. The sensing method according to claim 8, further comprising:
outputting a driving voltage through one of the driving lines unassigned to be electrically connected to the m×n sensing point matrix; and
sensing the electrically connected driving lines and sensing lines by the processing unit according to the frequencies.

13. The sensing method according to claim 8, further comprising:
performing the steps of comparing and selecting the sensing frequency by the processing unit through a statistical approach.

14. A capacitive touch device, comprising:
a capacitive touch panel, having an m×n sensing point matrix formed by m driving lines and n sensing lines, m and n being a positive integer, respectively;
a driving control unit, coupled to the m driving lines;
k analog-to-digital converters (ADCs), k being a positive integer;
a multiplex network, connecting the n sensing lines and the k ADCs by time-domain multiplexing;
at least one dummy scan line, disposed on the capacitive touch panel and connecting to one of the k ADCs; and
a processing unit, coupled to the k ADCs;
wherein, the processing unit senses the at least one electrically connected dummy scan line according to a plurality of frequencies within a predetermined range to obtain a plurality of signal strength values from the corresponding ADC, and selects the frequency corresponding to a smallest signal strength value to be a sensing frequency of the capacitive touch device.

15. The capacitive touch device according to claim 14, wherein the processing unit further selects the frequencies corresponding to smaller signal strength values to be sensing frequencies of the capacitive touch device.

16. The capacitive touch device according to claim 14, wherein the at least dummy scan line is further assigned to be electrically connected to at least a part of the driving lines and at least a part of the sensing lines.

17. The capacitive touch device according to claim 16, wherein the driving lines are grouped into first driving lines and second driving lines, the sensing lines are grouped into first sensing lines and second sensing lines, and the at least one dummy scan line is electrically connected to the first driving lines and the first sensing lines, or the at least one dummy scan line is electrically connected to the second driving lines and the second sensing lines.

18. The capacitive touch device according to claim 16, wherein one of the driving lines unassigned to be electrically connected outputs a driving voltage to the m×n sensing point matrix, and the processing unit senses the electrically connected driving lines, sensing lines and at least one dummy scan line according to the frequencies.

19. The capacitive touch device according to claim 14, wherein the processing unit compares and selects the sensing frequency through a statistical approach.

20. The capacitive touch device according to claim 14, wherein the at least one dummy scan line is disposed on the capacitive touch panel in a fencing layout arrangement, a quadrilateral layout arrangement, a vertical traversing strip-like arrangement, or a horizontal traversing strip-like arrangement.

* * * * *